United States Patent
Xiao et al.

(10) Patent No.: US 11,402,944 B2
(45) Date of Patent: Aug. 2, 2022

(54) ELECTRONIC APPARATUS AND CONTROLLING METHOD

(71) Applicant: Lenovo (Singapore) Pte. Ltd., Singapore (SG)

(72) Inventors: Limin Xiao, Kanagawa (JP); Moriyuki Tsuchihashi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/377,031

(22) Filed: Jul. 15, 2021

(65) Prior Publication Data

US 2022/0057889 A1 Feb. 24, 2022

(30) Foreign Application Priority Data

Aug. 18, 2020 (JP) .............................. JP2020-138060

(51) Int. Cl.
 *G06F 3/041* (2006.01)
 *G06F 3/044* (2006.01)
 *G06F 1/16* (2006.01)
 *H01R 35/02* (2006.01)

(52) U.S. Cl.
 CPC .......... *G06F 3/0418* (2013.01); *G06F 1/1681* (2013.01); *G06F 3/044* (2013.01); *G06F 3/04164* (2019.05); *H01R 35/02* (2013.01)

(58) Field of Classification Search
 CPC .. G06F 3/0418; G06F 3/04164; G06F 1/1681; G06F 3/044; H01R 35/02
 USPC .................................................. 345/173–174
 See application file for complete search history.

(56) References Cited

U.S. PATENT DOCUMENTS

| | | | |
|---|---|---|---|
| 10,819,920 B1* | 10/2020 | Hamlin | ................ G06F 1/1686 |
| 2004/0066616 A1 | 4/2004 | Chen et al. | |
| 2007/0075965 A1* | 4/2007 | Huppi | ............... H04M 1/72448 345/156 |
| 2008/0196945 A1* | 8/2008 | Konstas | ............. G06F 3/03547 178/18.03 |

FOREIGN PATENT DOCUMENTS

| | | | | |
|---|---|---|---|---|
| EP | 0943979 A2 * | 9/1999 | ............... | G06F 1/16 |
| JP | 2010-033376 A | 2/2010 | | |
| JP | 2013-164867 A | 8/2013 | | |
| JP | 2017-500661 A | 1/2017 | | |
| JP | 2017-062391 A | 3/2017 | | |
| JP | 2019200574 A | 11/2019 | | |

* cited by examiner

*Primary Examiner* — Kwin Xie
(74) *Attorney, Agent, or Firm* — Osha Bergman Watanabe & Burton LLP

(57) ABSTRACT

An electronic apparatus includes a first chassis that includes a touch sensor, a second chassis connected to the first chassis to be rotationally movable relative to each other, a touch controller that is installed on the second chassis, is electrically connected with the touch sensor, receives a detection signal that is output from the touch sensor and outputs data that is based on the received detection signal, a detection unit that detects relative rotational movement of the first chassis and the second chassis and a control unit that disables a result of detection by the touch sensor at least in a time period that the first chassis and the second chassis are being rotationally moved relative to each other on the basis of a result of detection by the detection unit.

4 Claims, 6 Drawing Sheets

ELECTRONIC APPARATUS AND CONTROLLING METHOD

CROSS-REFERENCE TO RELATED APPLICATIONS

This application claims priority to Japanese Patent Application No. 2020-138060 filed Aug. 18, 2020, the contents of which are hereby incorporated herein by reference in their entirety.

BACKGROUND

Technical Field

The present invention relates to an electronic apparatus and a controlling method.

Related Art

There exists a clamshell-shape (a laptop) PC (Personal Computer) that a touch-panel type display is loaded. In the clamshell-shape PC, a first chassis that a display is installed and a second chassis that a keyboard, a motherboard and so forth are installed are mutually connected to be rotationally movable via a hinge (for example, Japanese Unexamined Patent Application Publication No. 2019-200574).

In the clamshell-shape PC, there are cases where the first chassis and the second chassis are rotationally moved relative to each other while the PC is being used.

In a case where a display that an electrostatic capacitance system touch panel is loaded is used, it is necessary to install a controller board which controls the operation of the touch panel on the first chassis side and to physically fix an FPC (Flexible Printed Circuits) which mutually connects the touch panel and the controller board and the controller board to the first chassis side (for example, on the rear side of the display) in order to minimize a fluctuation in parasitic capacitance in a case where the first chassis and the second chassis are rotationally moved relative to each other.

However, from the viewpoint of portability and designability, it is requested to narrow a frame around the display and to thin the display side chassis (the first chassis) and, for this purpose, it is advantageous to install the controller board on the second chassis side. In this case, the PC is so configured that the touch panel which is installed on the first chassis side and the controller board which is installed on the second chassis side are electrically connected with each other by the FPC and so forth via the hinge. In this configuration, in a case where the first chassis and the second chassis are rotationally moved relative to each other, since the parasitic capacitance is changed due to movement of the FPC, noise immunity of the touch panel (a touch sensor) is reduced.

SUMMARY

One or more embodiments provide an electronic apparatus and a controlling method which suppress a reduction in noise immunity of the touch sensor.

One or more embodiments provide an electronic apparatus that includes a first chassis that a touch sensor is installed, a second chassis which is connected to the first chassis to be rotationally movable relative to each other, a touch controller which is installed on the second chassis, is electrically connected with the touch sensor, receives a detection signal which is output from the touch sensor and outputs data which is based on the received detection signal, a detection unit which detects relative rotational movement of the first chassis and the second chassis and a control unit which disables a result of detection by the touch sensor at least in a time period that the first chassis and the second chassis are being rotationally moved relative to each other on the basis of a result of detection by the detection unit.

In the electronic apparatus, in a case where the time period that the first chassis and the second chassis are being rotationally moved relative to each other expires, the control unit may enable the result of detection by the touch sensor.

In the electronic apparatus, in a case where the time period that the first chassis and the second chassis are being rotationally moved relative to each other expires, the control unit may execute calibration of the touch senor and then may enable the result of detection by the touch sensor.

In the electronic apparatus, the touch sensor and the touch controller may be electrically connected with each other via an FPC (Flexible Printed Circuits) and the detection signal which is output from the touch sensor may be input into the touch controller via the FPC.

In addition, an electronic apparatus according to one or more embodiments includes a first chassis a touch sensor is installed, a second chassis which is connected to the first chassis to be rotationally movable relative to each other, a detection unit which detects relative rotational movement of the first chassis and the second chassis and a control unit which disables a result of detection by the touch sensor at least in a time period that the first chassis and the second chassis are being rotationally moved relative to each other on the basis of a result of detection by the detection unit.

In addition, a controlling method for use in an electronic apparatus which includes a first chassis that a touch sensor is installed, a second chassis which is connected to the first chassis to be rotationally movable relative to each other, a touch controller which is installed on the second chassis, a detection unit and a control unit according to one or more embodiments includes the steps of receiving a detection signal which is output from the second chassis and outputting data which is based on the received detection signal by the touch controller which is electrically connected with the touch sensor, detecting relative rotational movement of the first chassis and the second chassis by the detection unit and disabling a result of detection by the touch sensor at least in a time period that the first chassis and the second chassis are being rotationally moved relative to each other by the control unit on the basis of a result of detection by the detection unit.

One or more embodiments can suppress the reduction in noise immunity of the touch sensor.

DETAILED DESCRIPTION

Embodiments of the present invention will be described below in detail with reference to the drawings.

First, an outline of an electronic apparatus 10 according to one or more embodiments will be described.

Figure 1:
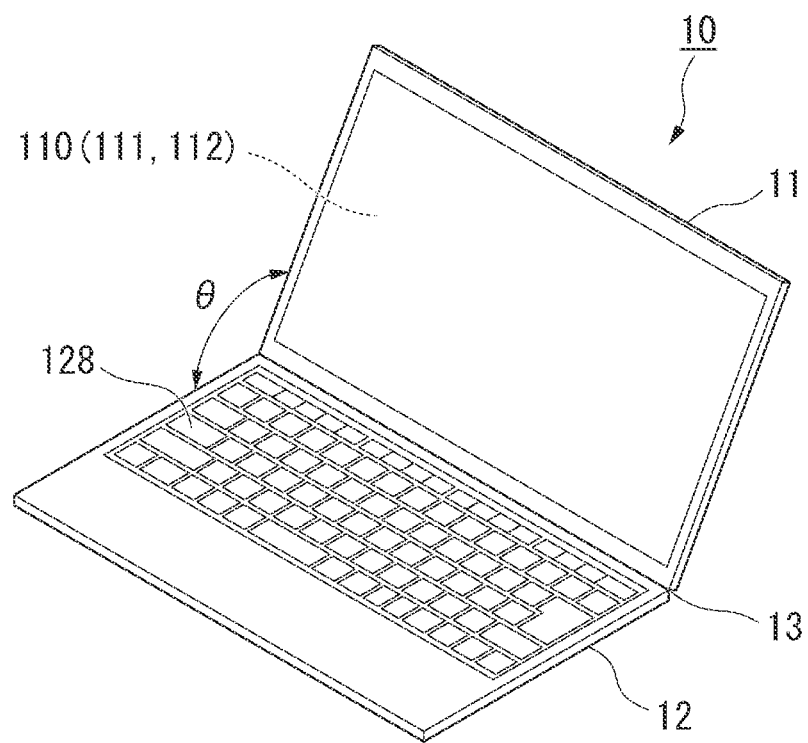
FIG. 1 is a perspective view illustrating one example of the external appearance of an electronic apparatus according to one or more embodiments.

FIG. 1 is a perspective view illustrating one example of the external appearance of the electronic apparatus 10 according to one or more embodiments. The electronic apparatus 10 which is illustrated in FIG. 1 is a clamshell-shape (a laptop) PC (Personal Computer). The electronic apparatus 10 includes a first chassis 11, a second chassis 12 and a hinge mechanism 13. The first chassis 11 and the second chassis 12 are almost quadrangular plate-shaped (for example, flat plate-shaped) chassis. One of side faces of the first chassis 11 and one of side faces of the second chassis 12 are coupled (linked) together via the hinge mechanism 13 and therefore the first chassis 11 and the second chassis 12 are rotationally movable relative to each other around an axis of rotation that the hinge mechanism 13 defines. A state where an opening angle θ between the first chassis 11 and the second chassis 12 around the axis of rotation is almost 0° is a state (referred to as a "closed state") where the first chassis 11 and the second chassis 12 are mutually closed in a folded state. In the closed state, faces on the sides that the first chassis 11 and the second chassis 12 mutually face will be called "inner faces" of the respective chassis 11 and 12 and faces thereof which are opposites to the inner faces will be called "outer faces" of the respective chassis 11 and 12. The opening angle θ may be also called an angle that the inner face of the first chassis 11 and the inner face of the second chassis 12 make. A state where the first chassis 11 and the second chassis 12 are opened in opposite direction will be called an "opened state" relative to the "closed state". The "opened state" is a state where the opening angle θ is more than a threshold value (for example, 10°) which is set in advance and typically ranges from about 100° to about 130°.

The external appearance of the electronic apparatus 10 in FIG. 1 illustrates one example of the opened state. In the opened state, the respective inner faces of the first chassis 11 and the second chassis 12 are revealed and it is expected that it will become possible for the electronic apparatus 10 to execute a normal operation. That is, in a case where a user intends to use the electronic apparatus 10, the user brings the electronic apparatus 10 into the opened state. Incidentally, it becomes possible for the user to optionally change the opening angle θ within a range of angles that the first chassis 11 and the second chassis 12 are rotationally movable with the aid of the hinge mechanism 15 also while the electronic apparatus 10 is being used.

A touch screen 110 is installed on the inner face of the first chassis 11. On the other hand, a keyboard 128 is installed on the inner face of the second chassis 12. In addition, a power source button, a USB (Universal Serial Bus) connector and so forth which are not illustrated are installed on the inner face or a side face/faces of the second chassis 12. In addition, a circuit board (a motherboard) that main electronic components which are used in processes that the electronic apparatus 10 executes are mounted, a battery and so forth are housed in the second chassis 12.

Figure 2:
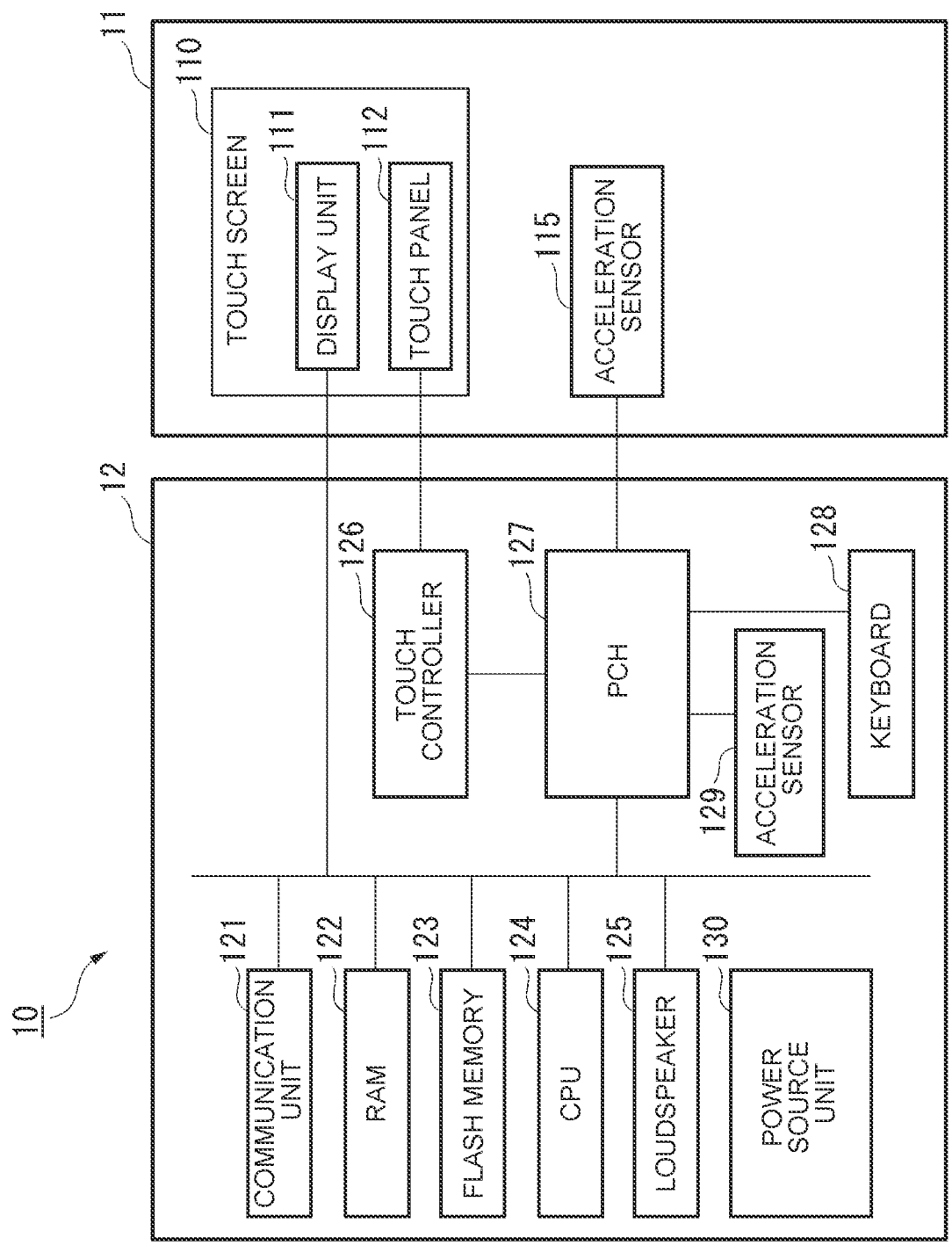
FIG. 2 is a block diagram illustrating one example of a hardware configuration of the electronic apparatus according to one or more embodiments.

FIG. 2 is a block diagram illustrating one example of a hardware configuration of the electronic apparatus 10 according to one embodiment. In FIG. 2, the same numerals are assigned to constitutional elements which correspond to respective components in FIG. 1. A touch screen 110 is installed on the first chassis 11 of the electronic apparatus 10. The touch screen 110 includes a display unit 111 and a touch panel 112 which is integrally installed on a screen of the display unit 111. The display unit 111 is configured by a liquid crystal display (LCD), an organic EL (Electro Luminescence) display and so forth. The touch panel 112 is configured by including a touch sensor which is formed on a glass or film substrate by using a transparent electrode and detects an operation of touching the screen while transmitting through display on the screen of the display unit 111. For example, the touch panel 112 is an electrostatic capacitance system touch panel. The touch panel 112 includes the touch sensor which detects an electrostatic capacitance which changes in accordance with the operation of touching a region which corresponds the screen of the display unit 111 and outputs a detection signal which accords with a touch position in the region in accordance with the operation of touching the screen. In addition, an acceleration sensor 115 is installed on the first chassis 11 of the electronic apparatus 10.

The second chassis 12 of the electronic apparatus 10 includes a communication unit 121, a RAM (Random Access Memory) 122, a Flash memory 123, a CPU (Central Processing Unit) 124, a loudspeaker 125, a touch controller 126, a PCH (Platform Controller Hub) 127, a keyboard 128, an acceleration sensor 129 and a power source unit 130.

The communication unit 121 is configured by communication devices and so forth which perform wireless communication such as, for example, digital input/output ports such as a plurality of Ethernet (registered trademark) ports, a plurality of USB (Universal Serial Bus) ports and so forth, a Bluetooth (registered trademark) router, a Wi-Fi (registered trademark) router and so forth.

Programs and data in accordance with which the CPU 124 performs arithmetic operations, controlling operations, processes and so forth are expanded in the RAM 122 and saving and erasing of various kinds of data are appropriately performed. In addition, the RAM 122 also functions as a video memory (V-RAM) which holds data to be displayed on the display unit 111.

The Flash memory 123 is a nonvolatile memory such as a Flash-ROM (Read Only Memory) and so forth. For example, a program which is called BIOS (Basic Input Output System) and BIOS Setup data, OS (Operating System), programs of various types of application software which operate on the OS and so forth are saved in the Flash memory 123.

The CPU 124 executes the BIOS, the OS and the programs of the various types of application software which operate on the OS and thereby performs the various arithmetic operations, various processes and so forth. For example, the CPU 124 performs memory control such as data-writing, data-erasing and so forth on the RAM 122, the Flash memory 123 and so forth, performs display control on the display unit 111 and performs control of sounds which are output from the loudspeaker 125 and so forth in accordance with execution of the above-described programs. Incidentally, the CPU 124 may be configured by internally or externally including a constitutional element which performs a specific arithmetic operation and a specific process such as a GPU (Graphic Processing Unit) and so forth. The loudspeaker 125 outputs electronic sounds, voices and so forth.

The touch controller 126 receives the detection signal which is output from the touch panel 112 and generates touch data which indicates contents of an operation which is performed on the touch panel 112 on the basis of the received detection signal. Here, the detection signal which is output from the touch panel 112 is an analog detection signal which accords with a change in electrostatic capacitance of the touch panel 112. The touch controller 126 outputs touch data in the form of a digital signal which is converted from the analog detection signal in accordance with touching ON/OFF.

The PCH 127 has a function of managing data bus which connects respective units with one another, a function of supporting the function of the CPU 124 and so forth. For example, the PCH 127 acquires key data in accordance with a keying operation on the keyboard 128 and outputs operation data which is based on the acquired key data to the CPU 124. In addition, the PCH 127 acquires the touch data which is output from the touch controller 126 and outputs operation data which is based on the acquired key data to the CPU 124. The CPU 124 executes the processes of the OS and the processes of the application software on the basis of the operation data which is acquired from the PCH 127.

In addition, the PCH 127 acquires results of measurement from the acceleration sensor 115 and the acceleration sensor 129 via an ISH (Integrated Sensor Hub) which configures part of the PCH 127. Then, the PCH 127 detects the relative rotational movement (opened/closed) of the first chassis 11 and the second chassis 12 on the basis of the results of measurement from the acceleration sensor 115 and the acceleration sensor 129. In addition, the PCH 127 controls enabling/disabling of a result of detection by the touch panel 112 and controls calibration of the touch panel 112. Control of enabling/disabling and calibration will be described later in detail. The acceleration sensor 115 is installed on the first chassis 11 side and measures an acceleration which accords with inclination and movement (a postural change) of the first chassis 11. The acceleration sensor 129 is installed on the second chassis 12 side and measures an acceleration which accords with inclination and movement (a postural change) of the second chassis 12.

The power source unit 130 supplies electric power to each unit of the electronic apparatus 10 via a power source system which supplies the electric power to each unit. The power source unit 130 includes a DC (Direct Current)/DC converter. The DC/DC converter converts a voltage of DC electric power which is supplied from an AC (Alternate Current)/DC adapter or a built-in battery to a voltage which is requested in each unit. The electric power that the voltage is converted by the DC/DC converter is supplied to each unit via each power source system.

Figure 3:
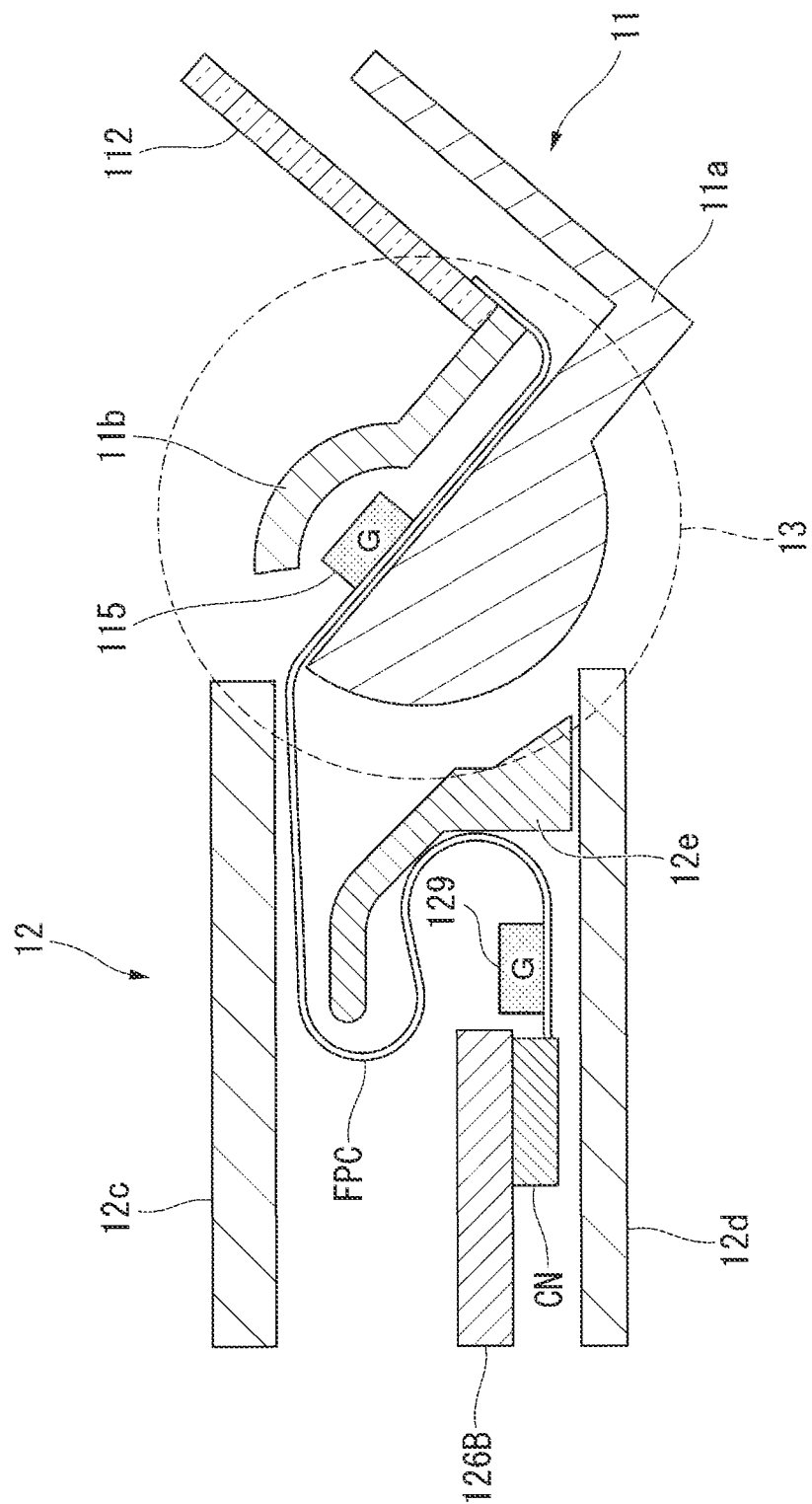
FIG. 3 is a schematic sectional diagram illustrating one example of part of a hinge mechanism of the electronic apparatus according to one or more embodiments.

Next, one example of connection ranging from the touch panel 112 to the touch controller 126 will be described. FIG. 3 is a schematic sectional diagram illustrating one example of part of the hinge mechanism 13 of the electronic apparatus 10. The touch panel 112 which is installed on the first chassis 11 and the touch controller 126 which is installed on the second chassis 12 are electrically connected with each other via an FPC (Flexible Printed Circuits). The FPC that one end is crimped to the touch panel 112 is wired to the second chassis 12 side, passing between an A cover 11a and a bezel 11b in the hinge mechanism 13. Here, the A cover 11a is a member which configures an outer face which is opposite to the inner face of the first chassis 11. In addition, the bezel 11b is a frame (a so-called frame part) which surrounds the periphery of the touch panel 112 in order to support the touch panel 112 (the touch screen 110).

On the second chassis 12 side, the other end of the FPC is connected to a controller board 126B via a connector CN. The controller board 126B is a PCB (Printed Circuit Board) that the touch controller 126 and so forth are mounted. Incidentally, the controller board 126B may be integrated with the motherboard (not illustrated) that the CPU 124 and so forth are mounted. In addition, in FIG. 3, a member which configures the inner face of the second chassis 12 is illustrated as a C cover 12c and a member which configures the outer face which is opposite to the inner face is illustrated as a D cover 12d. In addition, a guide member 12e guides FPC wiring to be housed in a folded-back and room-left state when drawing around the FPC wiring thereby to reduce a load on the FPC in a case where the first chassis 11 and the second chassis 12 are rotationally moved relative to each other. Thereby, in a case where the first chassis 11 and the second chassis 12 are mutually opened/closed, the FPC slightly moves in accordance with opening/closing movement of the chassis 11 and 12 thereby to avoid exertion of excessive tension on the FPC.

In addition, the acceleration sensor 115 is mounted on the first chassis 11 side of the FPC so as to operate in linkage with the movement of the first chassis 11. On the other hand, the acceleration sensor 129 is mounted on the second chassis 12 side of the FPC so as to operate in linkage with the movement of the second chassis 12. Incidentally, the acceleration sensor 115 and the acceleration sensor 129 may be installed on any places other than the FPC as long as the places allow the acceleration sensors 115 and 129 to operate in linkage with the movements of the first chassis 11 and the second chassis 12 respectively.

(Control of Enabling/Disabling of Result of Detection by Touch Panel)

As described with reference to FIG. 3, since the FPC moves in the middle (opening/closing is being performed) that the first chassis 11 and the second chassis 12 are being moved by being opened/closed, a parasitic capacitance changes. Since the detection signal which is output from the touch panel 112 is the analog signal, there is a possibility that erroneous detection would occur under the influence of noises caused by a change in parasitic capacitance in the time period that the opening/closing is being performed. Therefore, the electronic apparatus 10 disables the result of detection by the touch panel 112 at least in the time period that the opening/closing is being performed and thereby suppresses a reduction in noise immunity of the touch panel 112. In the following, control of enabling/disabling of the result of detection by the touch panel 112 will be described in detail.

Figure 4:
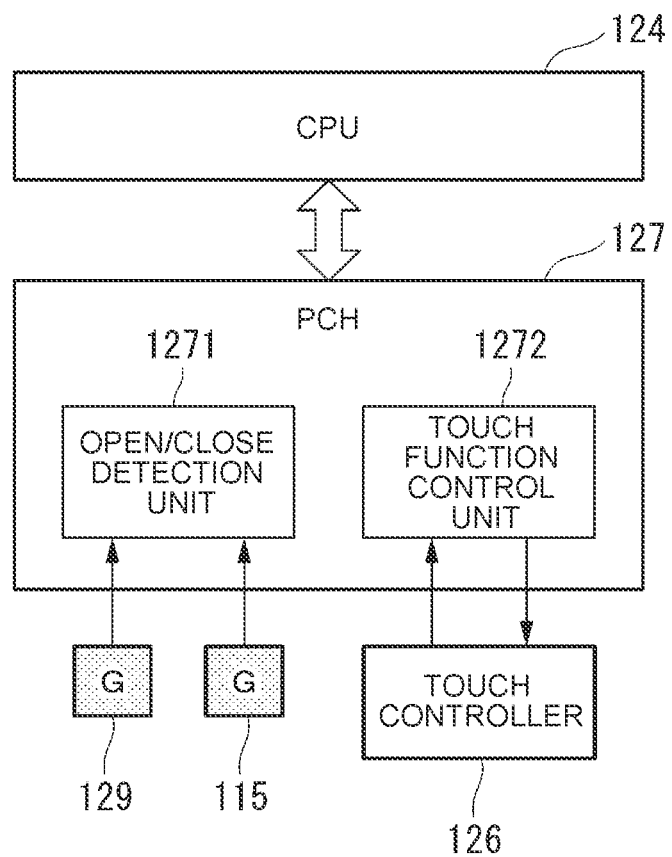
FIG. 4 is a diagram illustrating one example of a functional configuration pertaining to enabling/disabling control of a result of detection by a touch panel (sensor) in one or more embodiments.

FIG. 4 is a diagram illustrating one example of a functional configuration which relates to control of enabling/disabling of the result of detection by the touch panel 112. In FIG. 4, the same numerals are assigned to constitutional elements which correspond to the respective units in FIG. 2. The PCH 127 includes an open/close detection unit 1271 (one example of a detection unit) and a touch function control unit 1272 (one example of a control unit) as a functional configuration which is realized by execution of software.

The open/close detection unit 1271 acquires results of measurement from the acceleration sensor 115 and the acceleration sensor 129 and detects relative rotational movement (the opening/closing) of the first chassis 11 and the second chassis 12 on the basis of the acquired results of measurement. For example, the open/close detection unit 1271 detects whether the first chassis 11 and the second chassis 12 are in the opened state or the closed state (the opening angle θ), whether the opening/closing is being performed (that is, whether the first chassis 11 and the second chassis 12 are in the middle of relative rotational movement) and so forth on the basis of an acceleration which accords with inclination and movement (a postural change) of the first chassis 11 and an acceleration which accords with inclination and movement (a postural change) of the second chassis 12. Incidentally, the open/close detection unit 1271 may detect at least whether the opening/closing is being performed.

At start-up of the electronic apparatus 10, the touch function control unit 1272 enables the result of detection by the touch panel 112. Here, to enable the result of detection by the touch panel 112 indicates to output touch data which is acquired from the touch controller 126 to the CPU 124 and to apply the acquired data to a process which is being executed by the CPU 124. For example, in a case where the touch function control unit 1272 acquires the touch data from the touch controller 126 (in a case where a touch event generates), the touch function control unit 1272 outputs the acquired touch data to the CPU 124.

In addition, the touch function control unit 1272 disables the result of detection by the touch panel 112 at least in the time period that the first chassis 11 and the second chassis 12 are being rotationally moved relative to each other (the time period that the opening/closing is being performed) on the basis of the result of detection by the open/close detection unit 1271. In addition, in a case where the time period that the first chassis 11 and the second chassis 12 are being rotationally moved relative to each other (the time period that the opening/closing is being performed) is expired, the touch function control unit 1272 enables the result of detection by the touch panel 112. Incidentally, in a case where the time period that the first chassis 11 and the second chassis 12 are being rotationally moved relative to each other (the time period that the opening/closing is being performed) is expired, the touch function control unit 1272 may make the touch controller 126 execute calibration of the touch panel 112 and then may enable the result of detection by the touch panel 112.

Here, to disable the result of detection by the touch panel 112 means to stop output of the touch data from the touch controller 126 and not to apply the touch data to process which is being executed by the CPU 124 (that is, it is regarded that a touching operation is not performed even in a case where the touching operation is performed on the touch panel 112). For example, in a case where the result of detection by the touch panel 112 is to be disabled, the touch function control unit 1272 transmits a "Disable command" to the touch controller 126 to make the touch controller 126 temporarily stop output of the touch data. In addition, in a case of switching the result of detection by the touch panel 112 from a disabled state to an enabled state, the touch function control unit 1272 transmits an "Enable command" to the touch controller 126 to permit output of the touch data. Incidentally, in a case where the result of detection by the touch panel 112 is to be disabled, the touch function control unit 1272 may operate not to output the acquired touch data to the CPU 124 even when the touch data is acquired from the touch controller 126.

In addition, the touch function control unit 1272 transmits a "Calibration command" to the touch controller 126 and instructs the touch controller 126 to execute the calibration of the touch panel 112. In a case where the calibration is to be executed, the touch controller 126 regards a level of the detection signal which is output from the touch panel 112 (the signal which accords with the electrostatic capacitance) as the level of the signal which is obtained when the touching operation is not performed and corrects the level of the signal. Incidentally, in a case of instructing to execute the calibration of the touch panel 112, the touch function control unit 1272 may make the display unit 111 display information of giving notice that the touching operation is not performed. In addition, in a case of executing the calibration of the touch panel 112, the touch controller 126 may execute the calibration on the basis of both the detection signal which is output from the touch panel 112 in a case where no touching operation is performed and the detection signal which is output from the touch panel 112 in a case where the touching operation is being performed.

Figure 5:
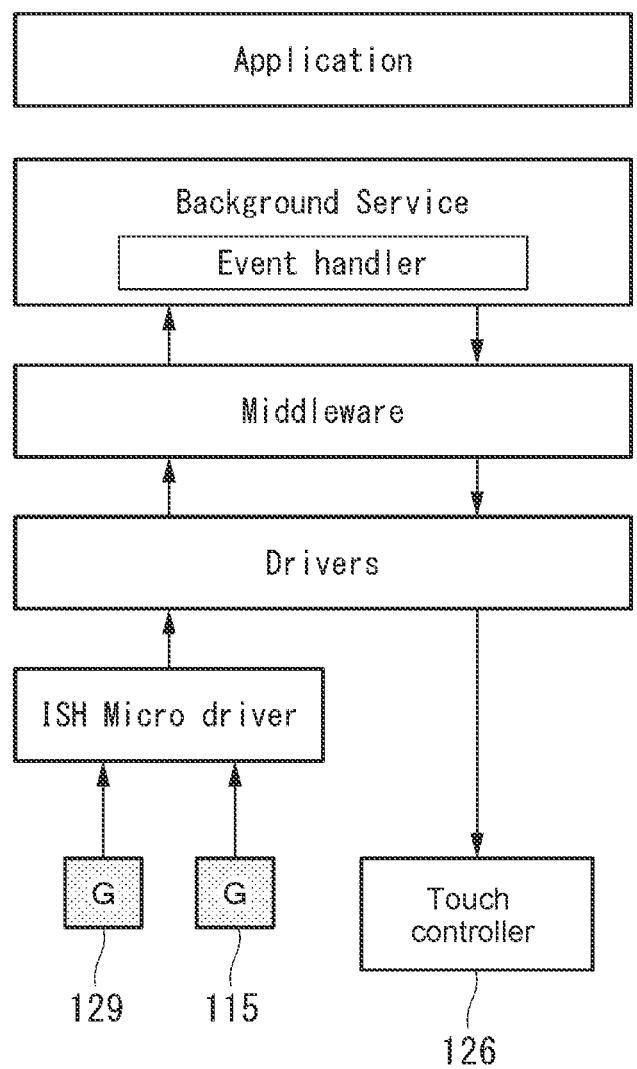
FIG. 5 is a diagram illustrating one example of a software configuration pertaining to the enabling/disabling control of the result of detection by the touch panel in one or more embodiments.

Next, a configuration of software that the PCH 127 executes in order to realize the above-mentioned functions will be described. FIG. 5 is a diagram illustrating one example of the software configuration which relates to the enabling/disabling control of the result of detection by the touch panel 112. An ISH (Integrated Sensor Hub) Micro driver executes a process which corresponds to the function of the open/close detection unit 1271 in FIG. 4. The ISH Micro driver acquires the results of measurement from the acceleration sensor 115 and the acceleration sensor 129, detects whether the opening/closing is being performed and generates an event which accords with whether the open/close movement is being performed, "Background Service" (Event handler) executes a process which corresponds to the function of the touch function control unit 1272 in FIG. 4. The "Background Service" selects a process which is applied to the application on the basis of an event which accords with whether the opening/closing is being performed and the result of detection by the touch panel 112 (a touch event). For example, the "Background Service" acquires the event which accords with whether the opening/closing is being performed from the "ISH Micro driver" via "Drivers" and "Middleware" and selects a process which accords with the acquired event. For example, the "Background Service" selects one of a process of controlling enabling/disabling of the result of detection by the touch panel 112, a process of executing the calibration of the touch panel 112 and so forth in accordance with the acquired event. Then, the "Background Service" transmits the "Disable command", the "Enable command", a "Calibration command" and so forth to the touch controller 126 via the "Middleware" and the "Drivers" in accordance with the selected process.

Next, an operation of the process of controlling enabling/disabling of the result of detection by the touch panel 112 will be described.

Figure 6:
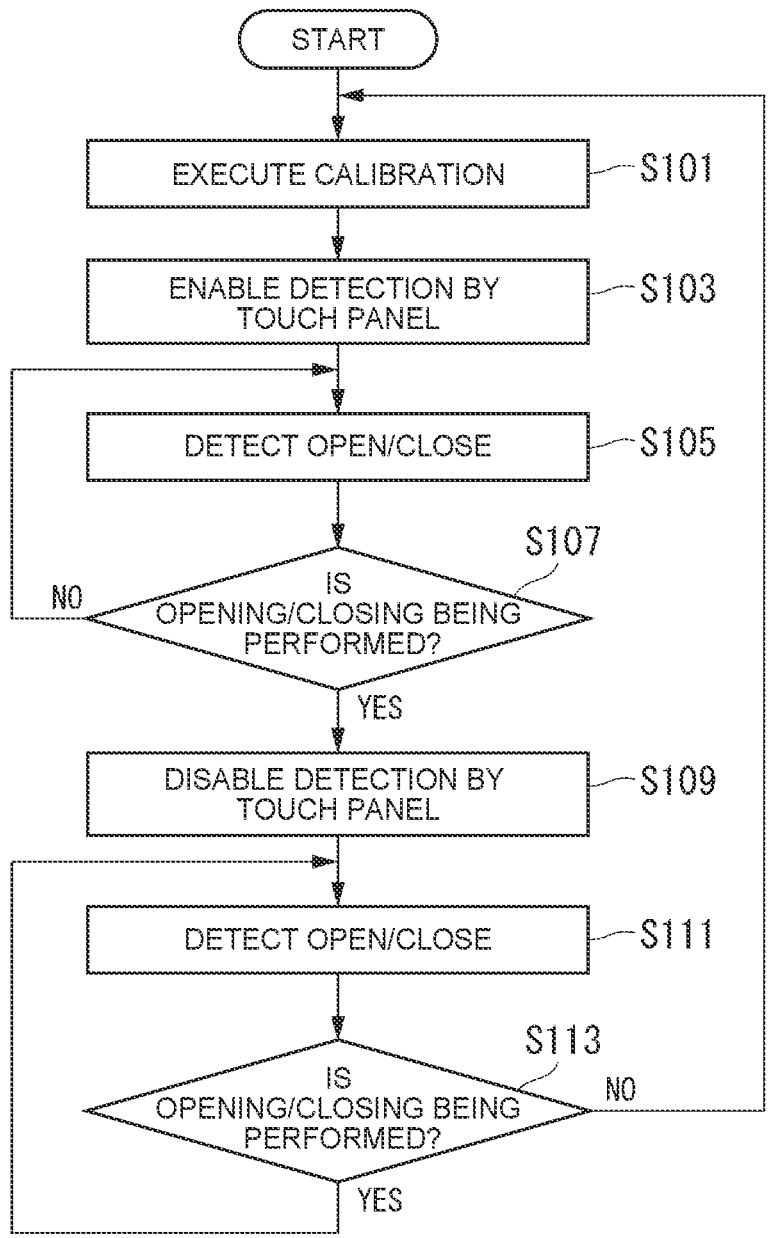
FIG. 6 is a flowchart illustrating one example of a process of controlling enabling/disabling of the result of detection by the touch panel in one or more embodiments.

FIG. 6 is a flowchart illustrating one example of the process of controlling enabling/disabling of the result of detection by the touch panel 112 pertaining to one or more embodiments.

(Step S101) In a case where the power source of the electronic apparatus 10 is turned ON and the electronic apparatus 10 is started up, first, the PCH 127 executes the calibration of the touch panel 112. For example, the PCH 127 transmits the "Calibration command" to the touch controller 126 and makes the touch controller 126 execute the calibration of the touch panel 112. The touch controller 126 executes the calibration on the basis of the detection signal which is output from the touch panel 112. Then, the PCH 127 proceeds to process in step S103.

(Step S103) The PCH 127 transmits the "Enable command" to the touch controller 126 and enables the result of detection by the touch panel 112. The PCH 127 outputs the touch data which is acquired from the touch controller 126 to the CPU 124 and applies the acquired touch data to the process which is executed by the CPU 124 and then proceeds to process in step S105.

(Step S105) The PCH 127 detects relative rotational movement (opening/closing) of the first chassis 11 and the second chassis 12 on the basis of the results of measurement from the acceleration sensor 115 and the acceleration sensor 129 and then proceeds to process in step S107.

(Step S107) The PCH 127 decides whether the opening/closing is being performed (that is, whether the first chassis 11 and the second chassis 12 are in the middle of being rotationally moved relative to each other) on the basis of the result of detection in step S105. In a case where it is decided that the opening/closing is not being performed (NO), the PCH 127 returns to process in step S105. That is, the PCH 127 maintains a state where the result of detection by the touch panel 112 is enabled. On the other hand, in a case where it is decided that the closing/opening is being performed (YES), the PCH 127 proceeds to process in step S109.

(Step S109) The PCH 127 transmits the "Disable command" to the touch controller 126 and disables the result of detection by the touch panel 112. Specifically, the PCH 127 stops output of the touch data from the touch controller 126 and does not apply the acquired touch data to the process which is being executed by the CPU 124.

(Step S111) The PCH 127 detects the relative rotational movement (the opening/closing) of the first chassis 11 and the second chassis 12 on the basis of the results of measurement from the acceleration sensor 115 and the acceleration sensor 129 and then proceeds to step S113.

(Step S113) The PCH 127 decides whether the opening/closing is being performed on the basis of the result of detection in step S111. In a case where it is decided that the opening/closing is being performed (YES), the PCH 127 returns to process in step S111 and continues detection until a state where the opening/closing is being performed is terminated. That is, the PCH 127 maintains a state where the result of detection by the touch panel 112 is disabled. On the other hand, in a case where it is decided that the opening/closing is not being performed (NO), the PCH 127 returns to process in step S101, executes the calibration of the touch panel 112 (step S101) and then enables the result of detection by the touch panel 112 (step S103).

As described above, the electronic apparatus 10 according to one or more embodiments includes the first chassis 11 that the touch panel 112 (one example of the touch sensor) is installed and the second chassis 12 which is connected to the first chassis 11 to be rotationally movable relative to each other. The electronic apparatus 10 detects the relative rotational movement of the first chassis 11 and the second chassis 12 and disables the result of detection by the touch panel 112 at least in the time period that the first chassis 11 and the second chassis 12 are being rotationally moved relative to each other (the time period that the opening/closing is being performed).

Thereby, since the electronic apparatus 10 disables the result of detection by the touch panel 112 in the time period that the opening/closing of the first chassis 11 and the second chassis 12 are being performed, even in a case where noise is generated by opening/closing of the first chassis 11 and the second chassis 12, the electronic apparatus 10 is not affected by the noise and therefore it becomes possible to suppress the reduction in noise immunity of the touch panel 112. In addition, in the time period that opening/closing of the first chassis 11 and the second chassis 12 are being performed, the necessity to operate the electronic apparatus 10 is low for the user and therefore even in a case where the result of detection by the touch panel 112 is disabled in the time period that the opening/closing is being performed, influence on operability is little. Accordingly, it becomes possible for the electronic apparatus 10 to suppress the reduction in noise immunity of the touch panel 112 without impairing the operability.

In addition, in a case where the time period that the first chassis 11 and the second chassis 12 are being rotationally moved relative to each other is expired, the electronic apparatus 10 enables the result of detection by the touch panel 112.

Thereby, it becomes possible for the electronic apparatus 10 to execute the process in accordance with the operation of touching the touch panel 112 in a time period that the opening/closing is not being performed.

For example, in a case where the time period that the first chassis 11 and the second chassis 12 are being rotationally moved relative to each other is expired, the electronic apparatus 10 executes the calibration of the touch panel 112 and then enables the result of detection by the touch panel 112.

Thereby, it becomes possible for the electronic apparatus 10 to avoid a reduction in detection accuracy which would occur in a case where the result of detection by the touch panel 112 is once disabled and is enabled after that.

In addition, the electronic apparatus 10 includes the touch controller 126 which receives the detection signal which is output from the touch panel 112 and outputs the touch data which is based on the received detection signal. Then, the touch controller 126 is installed on the second chassis 12 and is electrically connected with the touch panel 112 which is installed on the first chassis 11.

Thereby, it becomes possible for the electronic apparatus 10 to suppress the reduction in noise immunity of the touch panel 112 even in a case where the touch panel 112 and the touch controller 126 are installed on the separate chassis and then are electrically connected with each other.

In addition, in the electronic apparatus 10, the touch panel 112 and the touch controller 126 are mutually connected via the FPC and the detection signal which is output from the touch panel 112 is input into the touch controller 126 via the FPC.

Thereby, it becomes possible for the electronic apparatus 10 to suppress the reduction in noise immunity of the touch panel 112 even in a case where the touch panel 112 and the touch controller 126 are installed on the separate chassis and then are mutually connected via the FPC.

As above, although one or more embodiments is described in detail with reference to the drawings, specific configurations are not limited to the above-described ones and it is possible to make a design change and so forth in a variety of ways within the range not deviating from the gist of the present invention. For example, the configurations which are described in one embodiment may be mutually combined optionally.

Incidentally, although, in one embodiment, an example that the touch panel 112 and the touch controller 216 are electrically connected with each other via the FPC, the touch panel 112 and the touch controller 216 may be mutually connected via a wire (a wire rod) and so forth, not limited to the FPC.

In addition, although in one embodiment, a configuration example that the PCH 127 has the functions of the open/close detection unit 1271 and the touch function control unit 1272 is described, a processing unit(s) other than the PCH 127 may have some of or all the functions of the open/close detection unit 1271 and the touch function control unit 1272. For example, various chip sets, an EC (Embedded Controller), the CPU 124 and so forth may have some of or all the functions of the open/close detection unit 1271 and the touch function control unit 1272.

In addition, the electronic apparatus 10 has the computer system which is embedded therein. Then, the processes that the respective above-described constitutional elements of the electronic apparatus 10 have may be performed by recording programs for realizing the functions of the respective constitutional elements that the electronic apparatus 10 includes into a computer-readable recording medium, making the computer system read the programs which are recorded in the recording medium and executing the programs. Here, "making the computer system read the programs which are recorded in the recording medium and executing the programs" includes to install the programs into the computer system. The "computer system" which is called here shall include the OS and hardware such as peripherals and so forth. In addition, the "computer system" may also include a plurality of computer devices which are mutually connected over networks which include communication lines such as the Internet, a WAN (Wide Area Network), a LAN (Local Area Network), a privately leased line and so forth. In addition, the "computer-readable recording medium" means portable media such as a flexible disk, a magneto-optical disk, a ROM (Read Only Memory), a CD (Compact Disk)-ROM and so forth and storage devices such as a hard disk and so forth which are built in the computer system. The recording medium which records the programs in this way may be also a non-transitory recording medium such as the CD-ROM and so forth.

In addition, the recording medium also include an internally or externally installed recording medium which is accessible from a distribution server in order to distribute the program concerned. Incidentally, one program may be divided into a plurality of programs and, the respective divided programs may be down-loaded at different timings and then may be combined with one another by respective constitutional elements that the electronic apparatus 10 includes. The divided programs may be distributed from mutually different distribution servers. Further, the "computer-readable recording medium" shall also include a medium which holds a program for a definite time period such as the server which is in a state where the program is transmitted thereto over a network, a nonvolatile memory (RAM: Random Access Memory) which is built in the computer system and works as a client and so forth. In addition, the program may be also a program for realizing some of the above-described functions. Further, the program may be also the program which makes it possible to realize the above-mentioned functions by being combined with a program which is already recorded in the computer system, that is, a so-called differential file (a differential program).

In addition, some of or all the functional elements that the electronic apparatus 10 according to one embodiment has may be realized as an integrated circuit such as an LSI (Large Scale Integration) and so forth. The respective functional elements may be processorized individually and some of or all the functional elements may be also integrated and processorized. In addition, a technique of circuit integration may be realized by a private circuit or a general-purpose processor, not limited to the LSI. In addition, in a case where a novel circuit integration technology which realizes an integrated circuit which will take the place of the LSI emerges owing to advancement of the semiconductor technology, the integrated circuit which is realized by the novel technology may be used.

In addition, although in one embodiment, an example that the electronic apparatus 10 is the clamshell-shape PC is described, the electronic apparatus is not limited to the clamshell-shape PC and may be other electronic apparatuses (such as a smartphone, a gaming machine and so forth) which includes a plurality of chassis which is rotationally movable via the hinge mechanism.

In addition, although in one embodiment, an example of the touch panel 112 which is configured to be integrated with the display unit 111 (the display) is described as one example of the touch sensor, the touch sensor is not limited to the touch panel. For example, the touch sensor may be also a touch panel (for example, a touch pad and so forth) which is not configured to be integrated with the display. In addition, the touch sensor may be also a touch panel of the type of simply detecting presence/absence of a touch, not limited to the type of detecting the touch position in the specific area.

In addition, although in one embodiment, an example that whether the first chassis 11 and the second chassis 12 are in the opened states or the closed states is detected by using the acceleration sensors 115 and 129 is described, the detection method is not limited to the method using the acceleration sensors 115 and 129. For example, the states of the chassis 11 and 12 may be detected by using gyro sensors, inclination sensors, magnetic sensors, geomagnetic sensors and so forth, in place of or in addition to the acceleration sensors 115 and 129.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

10 . . . electronic apparatus, 11 . . . first chassis, 12 . . . second chassis, 13 . . . hinge mechanism, 110 . . . touch screen, 111 . . . display unit, 112 . . . touch panel, 115 . . . acceleration sensor, 121 . . . communication unit, 122 . . . RAM, 123 . . . Flash memory, 124 . . . CPU, 125 . . . loudspeaker, 126 . . . touch controller, 127 . . . PCH, 1271 . . . open/close detection unit, 1272 . . . touch function control unit, 128 . . . keyboard, 129 . . . acceleration sensor, 130 . . . power source unit

What is claimed is:
1. An electronic apparatus comprising:
a first chassis that comprises a touch sensor;
a second chassis connected to the first chassis to be rotationally movable relative to each other;
a touch controller that is installed on the second chassis, is electrically connected with the touch sensor, and receives a detection signal that is output from the touch sensor and to output data that is based on the received detection signal;
a detection unit that detects relative rotational movement of the first chassis and the second chassis; and
a control unit that disables a result of detection by the touch sensor at least in a time period that the first chassis and the second chassis are being rotationally moved, relative to each other between a first open position and a second open position, on the basis of a result of detection by the detection unit, wherein the first open position is different from the second open position, and the control unit executes calibration of the touch sensor and then enables the result of detection by the touch sensor at an expiration of the time period that the first chassis and the second chassis are being rotationally moved relative to each other between the first open position and the second open position.

2. The electronic apparatus according to claim 1, wherein the touch sensor and the touch controller are electrically connected with each other via an Flexible Printed Circuit (FPC), and the detection signal that is output from the touch sensor is input into the touch controller via the FPC.

3. An electronic apparatus comprising:

a first chassis that comprises a touch sensor;

a second chassis connected to the first chassis to be rotationally movable relative to each other;

a detection unit that detects relative rotational movement of the first chassis and the second chassis; and a control unit that disables a result of detection by the touch sensor at least in a time period that the first chassis and the second chassis are being rotationally moved relative to each other between a first open position and a second open position, on the basis of a result of detection by the detection unit, wherein the first open position is different from the second open position, and the control unit executes calibration of the touch sensor and then enables the result of detection by the touch sensor at an expiration of the time period that the first chassis and the second chassis are being rotationally moved relative to each other between the first open position and the second open position.

4. A controlling method for use in an electronic apparatus that includes a first chassis comprising a touch sensor, a second chassis connected to the first chassis to be rotationally movable relative to each other, a touch controller installed on the second chassis, a detection unit, and a control unit, the controlling method comprising:

receiving a detection signal that is output from the second chassis and outputting data that is based on the received detection signal by the touch controller electrically connected with the touch sensor;

detecting relative rotational movement of the first chassis and the second chassis by the detection unit; and disabling a result of detection by the touch sensor at least in a time period that the first chassis and the second chassis are being rotationally moved, relative to each other between a first open position and a second open position, by the control unit on the basis of a result of detection by the detection unit, wherein the first open position is different from the second open position, and the control unit executes calibration of the touch sensor and then enables the result of detection by the touch sensor at an expiration of the time period that the first chassis and the second chassis are being rotationally moved relative to each other between the first open position and the second open position.

* * * * *